US009931595B2

(12) United States Patent
Yaluris et al.

(10) Patent No.: US 9,931,595 B2
(45) Date of Patent: Apr. 3, 2018

(54) FERRIERITE COMPOSITION FOR REDUCING $NO_x$ EMISSIONS DURING FLUID CATALYTIC CRACKING

(75) Inventors: George Yaluris, Columbia, MD (US); Michael Scott Ziebarth, Columbia, MD (US); Xinjin Zhao, Woodbine, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 337 days.

(21) Appl. No.: 12/833,336

(22) Filed: Jul. 9, 2010

(65) Prior Publication Data
US 2010/0276337 A1 Nov. 4, 2010

Related U.S. Application Data

(60) Division of application No. 10/909,706, filed on Aug. 2, 2004, which is a continuation-in-part of application
(Continued)

(51) Int. Cl.
*B01D 53/86* (2006.01)
*B01J 23/00* (2006.01)
(Continued)

(52) U.S. Cl.
CPC .......... *B01D 53/8628* (2013.01); *B01J 23/42* (2013.01); *B01J 23/83* (2013.01); *B01J 29/65* (2013.01);
(Continued)

(58) Field of Classification Search
USPC ...... 423/212, 235, 239.1, 239.2; 502/64, 65, 502/68, 73, 77, 80
See application file for complete search history.

(56) References Cited

U.S. PATENT DOCUMENTS

| 2,892,801 A | 6/1959 | Sargent ......................... 252/474 |
| 3,036,973 A | 5/1962 | Hindley et al. ................ 252/474 |

(Continued)

FOREIGN PATENT DOCUMENTS

| EP | 0355928 | 2/1990 | ............. C10G 11/05 |
| EP | 0536815 | 4/1993 | ............. C10G 11/05 |

(Continued)

OTHER PUBLICATIONS

American Chemical Society Symposium Series, No. 634,"Contaminant-Metal Deactivation and Metal-Dehydrogenation Effects During Cyclic Propylene Steaming of Fluid Catalytic Cracking Catalysts", Ch 12, pp. 171-183 (1996) by L.T. Boock, T.F. Petti, and J.A. Rudesill.

(Continued)

Primary Examiner — Devang R Patel
(74) Attorney, Agent, or Firm — Charles A. Cross; Beverly J. Artale

(57) ABSTRACT

Compositions for reduction of $NO_x$ generated during a catalytic cracking process, preferably, a fluid catalytic cracking process, are disclosed. The compositions comprise a fluid catalytic cracking catalyst composition, preferably containing a Y-type zeolite, and a particulate $NO_x$ reduction composition containing ferrierite zeolite particles. Preferably, the $NO_x$ reduction composition contains ferrierite zeolite particles bound with an inorganic binder. In the alternative, the ferrierite zeolite particles are incorporated into the cracking catalyst as an integral component of the catalyst. $NO_x$ reduction compositions in accordance with the invention are very effective for the reduction of $NO_x$ emissions released from the regenerator of a fluid catalytic cracking unit operating under FCC process conditions without a substantial change in conversion or yield of cracked (Continued)

products. Processes for the use of the compositions are also disclosed.

40 Claims, 1 Drawing Sheet

Related U.S. Application Data

No. 10/702,240, filed on Nov. 6, 2003, now abandoned.

(51) Int. Cl.
| | |
|---|---|
| B01J 23/42 | (2006.01) |
| B01J 23/83 | (2006.01) |
| B01J 29/65 | (2006.01) |
| B01J 29/80 | (2006.01) |
| B01J 35/00 | (2006.01) |
| C10G 11/18 | (2006.01) |
| B01J 29/08 | (2006.01) |
| B01J 37/00 | (2006.01) |

(52) U.S. Cl.
CPC ........... *B01J 29/80* (2013.01); *B01J 35/0006* (2013.01); *C10G 11/18* (2013.01); *C10G 11/182* (2013.01); *B01D 2255/50* (2013.01); *B01D 2258/00* (2013.01); *B01J 29/084* (2013.01); *B01J 35/002* (2013.01); *B01J 37/0045* (2013.01); *B01J 2229/18* (2013.01); *B01J 2229/42* (2013.01); *C10G 2300/405* (2013.01)

(56) References Cited

U.S. PATENT DOCUMENTS

| | | | |
|---|---|---|---|
| 3,129,252 A | 4/1964 | Graham et al. | 260/637 |
| 3,184,417 A | 5/1965 | Hort | 252/474 |
| 3,617,488 A | 11/1971 | Csicsery | 208/59 |
| 3,634,140 A | 1/1972 | Krusenstierna | 136/86 B |
| 3,894,940 A * | 7/1975 | Scherzer et al. | 502/67 |
| 4,064,511 A | 10/1977 | Maile et al. | 208/120.15 |
| 4,086,187 A * | 4/1978 | Lim et al. | 502/68 |
| 4,138,326 A * | 2/1979 | Swift | B01J 23/888 208/108 |
| 4,170,571 A | 10/1979 | Ritscher | 252/455 Z |
| 4,199,435 A | 4/1980 | Chessmore et al. | 208/113 |
| 4,290,878 A | 9/1981 | Blanton, Jr. | 208/120 |
| 4,309,279 A | 1/1982 | Chester et al. | 208/120 |
| 4,368,057 A | 1/1983 | Matthews | 47/197 |
| 4,377,502 A | 3/1983 | Klotz | 252/455 Z |
| 4,427,536 A | 1/1984 | Klaassen et al. | 208/113 |
| 4,428,827 A | 1/1984 | Hobbs et al. | 208/120 |
| 4,434,147 A | 2/1984 | Dimpfl et al. | 423/235 |
| 4,458,023 A * | 7/1984 | Welsh et al. | 502/65 |
| 4,469,589 A | 9/1984 | Yoo et al. | 208/120 |
| 4,471,070 A | 9/1984 | Siefert et al. | 502/302 |
| 4,472,267 A | 9/1984 | Yoo et al. | 208/120 |
| 4,472,532 A | 9/1984 | Mooi | 502/302 |
| 4,473,658 A | 9/1984 | Schwartz | 502/45 |
| 4,476,245 A | 10/1984 | Siefert | 502/302 |
| 4,495,304 A | 1/1985 | Yoo et al. | 502/66 |
| 4,495,305 A | 1/1985 | Yoo et al. | 502/65 |
| 4,513,091 A | 4/1985 | Chang et al. | 502/71 |
| 4,521,298 A | 6/1985 | Rosinski et al. | |
| 4,522,937 A | 6/1985 | Yoo et al. | 502/302 |
| 4,582,815 A | 4/1986 | Bowes | 502/64 |
| 4,608,355 A | 8/1986 | Chu | 502/88 |
| 4,642,178 A | 2/1987 | Yoo et al. | |
| 4,654,316 A | 3/1987 | Barri et al. | 502/6 T |
| 4,708,786 A | 11/1987 | Occelli | |
| 4,728,635 A | 3/1988 | Bhattacharyya | 502/304 |
| 4,735,927 A | 4/1988 | Gerdes | 502/64 |
| 4,744,962 A | 5/1988 | Johnson et al. | 423/235 |
| 4,747,935 A | 5/1988 | Scherzer | 208/120 |
| 4,755,282 A | 7/1988 | Samish et al. | |
| 4,758,418 A | 7/1988 | Yoo et al. | 423/244 |
| 4,778,664 A | 10/1988 | Grinstead | 423/235 |
| 4,778,665 A | 10/1988 | Krishnamurthy et al. | 423/239 |
| 4,790,982 A | 12/1988 | Yoo et al. | 423/239 |
| 4,797,266 A | 1/1989 | Evans | 423/328 |
| 4,798,813 A | 1/1989 | Kato | 502/60 |
| 4,810,369 A | 3/1989 | Scherzer | 208/120 |
| 4,812,430 A | 3/1989 | Child | 502/42 |
| 4,818,509 A | 4/1989 | Dwyer et al. | 423/329 |
| 4,812,431 A | 5/1989 | Child | 502/42 |
| 4,826,799 A | 5/1989 | Chang et al. | 502/301 |
| 4,830,840 A | 5/1989 | Bhattacharyya | 423/239 |
| 4,839,026 A | 6/1989 | Brown et al. | 208/120 |
| 4,853,203 A | 8/1989 | Guth et al. | 423/328 |
| 4,855,115 A | 8/1989 | Imanari | 423/239 |
| 4,880,521 A | 11/1989 | Scherzer | 208/120 |
| 4,889,615 A | 12/1989 | Chin et al. | 208/113 |
| 4,895,994 A | 1/1990 | Cheng et al. | 585/270 |
| 4,898,846 A | 2/1990 | Edwards et al. | 502/67 |
| 4,904,627 A | 2/1990 | Bhattacharyya | 502/63 |
| 4,923,842 A | 5/1990 | Summers | 502/261 |
| 4,946,581 A | 8/1990 | van Broekhoven | |
| 4,952,382 A | 8/1990 | van Broekhoven | 423/244 |
| 4,957,718 A | 9/1990 | Yoo et al. | 423/244 |
| 4,957,892 A | 9/1990 | Yoo et al. | 502/63 |
| 4,963,520 A | 10/1990 | Yoo et al. | 502/64 |
| 4,973,399 A | 11/1990 | Green et al. | 208/120 |
| 4,976,847 A | 12/1990 | Maxwell et al. | 208/120 |
| 4,980,052 A | 12/1990 | Green et al. | 208/120 |
| 4,986,897 A | 1/1991 | Chin | 208/113 |
| 4,988,432 A * | 1/1991 | Chin | 208/121 |
| 4,988,654 A | 1/1991 | Kennedy et al. | 502/84 |
| 5,002,653 A | 3/1991 | Kennedy et al. | 208/118 |
| 5,002,654 A | 3/1991 | Chin | 208/121 |
| 5,015,362 A | 5/1991 | Chin | 208/121 |
| 5,017,538 A | 5/1991 | Takeshima | 502/64 |
| 5,021,144 A | 6/1991 | Altrichter | 208/113 |
| 5,037,538 A | 8/1991 | Chin et al. | 208/113 |
| 5,041,272 A | 8/1991 | Tamura et al. | 423/239 |
| 5,057,205 A | 10/1991 | Chin | 208/121 |
| 5,069,776 A | 12/1991 | Biswas et al. | 208/120 |
| 5,102,530 A | 4/1992 | Edwards et al. | 208/120 |
| 5,114,691 A | 5/1992 | Pinnavaia et al. | 423/244 |
| 5,114,898 A | 5/1992 | Pinnavaia et al. | 502/406 |
| 5,130,012 A | 7/1992 | Edwards et al. | 208/113 |
| 5,145,815 A | 9/1992 | Zarchy | 502/52 |
| 5,171,553 A | 12/1992 | Li et al. | 423/239 |
| 5,173,278 A | 12/1992 | Marler | 423/239 |
| 5,174,980 A | 12/1992 | Hellring et al. | 423/706 |
| 5,190,736 A | 3/1993 | Hellring et al. | 423/706 |
| 5,206,196 A | 4/1993 | Nakano et al. | 502/73 |
| 5,208,198 A | 5/1993 | Nakano et al. | 502/74 |
| 5,240,690 A | 8/1993 | Tang | 423/236 |
| 5,260,043 A | 11/1993 | Li | 423/239.2 |
| 5,260,240 A | 11/1993 | Guthrie et al. | 502/41 |
| 5,268,089 A | 12/1993 | Avidan et al. | 208/113 |
| 5,270,024 A | 12/1993 | Kasahara | 423/213.2 |
| 5,286,693 A | 2/1994 | Ino et al. | 502/68 |
| 5,294,332 A | 3/1994 | Klotz | 208/120 |
| 5,320,822 A | 6/1994 | Ozin et al. | 423/700 |
| 5,364,517 A * | 11/1994 | Dieckmann et al. | 208/121 |
| 5,371,055 A | 12/1994 | Cormier et al. | 502/65 |
| 5,372,706 A | 12/1994 | Buchanan et al. | 208/113 |
| 5,374,409 A | 12/1994 | Kasahara | 423/213.2 |
| 5,374,410 A | 12/1994 | Grasselli et al. | 423/239 |
| 5,382,352 A | 1/1995 | Hansen et al. | 208/121 |
| 5,413,699 A | 5/1995 | Chou | 208/113 |
| 5,413,977 A | 5/1995 | Occelli | 502/66 |
| 5,422,333 A | 6/1995 | Kano et al. | 502/60 |
| 5,427,989 A | 6/1995 | Kanesaka | 502/66 |
| 5,433,933 A | 7/1995 | Eshita et al. | 423/213.2 |
| 5,443,803 A | 8/1995 | Mizuno | 423/213.2 |
| 5,472,677 A | 12/1995 | Farris et al. | 423/239 |
| 5,503,818 A | 4/1996 | Nicolaides et al. | 423/327.1 |
| 5,510,306 A | 4/1996 | Murray | 502/64 |
| 5,543,125 A | 8/1996 | Uchida | 423/239.2 |
| 5,547,648 A | 8/1996 | Buchanan et al. | 423/210 |

(56) References Cited

U.S. PATENT DOCUMENTS

| | | | |
|---|---|---|---|
| 5,552,129 A | 9/1996 | Famos et al. | 432/239.2 |
| 5,565,181 A | 10/1996 | Dieckmann et al. | 423/239.1 |
| 5,589,147 A | 12/1996 | Famos et al. | 423/239.2 |
| 5,591,418 A | 1/1997 | Bhattacharyya | 423/239.1 |
| 5,599,520 A | 2/1997 | Garces et al. | 423/700 |
| 5,614,453 A | 3/1997 | Occelli | 502/66 |
| 5,627,125 A | 5/1997 | Ebner et al. | 502/331 |
| 5,695,728 A | 12/1997 | Miura | 423/239.2 |
| 5,705,053 A | 1/1998 | Buchanan | 208/113 |
| 5,716,514 A | 2/1998 | Buchanan | 208/113 |
| 5,741,468 A | 4/1998 | Saito | 423/239 T |
| 5,744,113 A | 4/1998 | Hums | 423/239 T |
| 5,744,686 A | 4/1998 | Gajda | 585/823 |
| 5,750,020 A | 5/1998 | Bhattacharyya et al. | 208/113 |
| 5,785,947 A | 7/1998 | Zones et al. | 423/705 |
| 5,807,528 A | 9/1998 | Nakona et al. | 423/213.2 |
| 5,827,793 A | 10/1998 | Hu | 502/41 |
| 5,830,346 A | 11/1998 | Harandi et al. | |
| 5,879,645 A | 3/1999 | Park | |
| 5,908,804 A | 6/1999 | Menon et al. | 502/38 |
| 5,908,806 A | 6/1999 | Kharas | 502/64 |
| 5,917,069 A | 6/1999 | Buckl | 554/193 |
| 5,955,046 A | 9/1999 | Okimura et al. | 423/239.1 |
| 5,958,818 A | 9/1999 | Demmel et al. | 502/68 |
| 5,985,225 A | 11/1999 | Ohtsuka | 423/239.2 |
| 5,993,642 A | 11/1999 | Mohr et al. | 208/46 |
| 6,017,508 A | 1/2000 | Millar et al. | 423/700 |
| 6,027,696 A | 2/2000 | Das et al. | 422/144 |
| 6,033,641 A | 3/2000 | Hall et al. | 423/239.2 |
| 6,040,259 A | 3/2000 | Mohr | 502/67 |
| 6,090,271 A | 7/2000 | Carpency | 208/113 |
| 6,103,208 A | 8/2000 | Ogawa et al. | 423/213.2 |
| 6,103,949 A | 8/2000 | Demmel et al. | 565/722 |
| 6,106,697 A | 8/2000 | Swan et al. | 208/77 |
| 6,110,258 A | 8/2000 | Fraenkel et al. | 95/117 |
| 6,114,265 A | 9/2000 | Steffens et al. | 502/52 |
| 6,129,834 A | 10/2000 | Peters et al. | 208/120.01 |
| 6,143,167 A | 11/2000 | Peters et al. | 208/113 |
| 6,143,261 A | 11/2000 | Lissy et al. | 423/213.5 |
| 6,143,681 A | 11/2000 | Sachtler et al. | 502/74 |
| 6,165,933 A * | 12/2000 | Peters et al. | 502/330 |
| 6,190,538 B1 | 2/2001 | Gosselink et al. | 208/111.01 |
| 6,214,211 B1 | 4/2001 | Itoh | 208/118 |
| 6,280,607 B1 | 8/2001 | Peters et al. | 208/120.01 |
| 6,284,703 B1 | 9/2001 | Ostgard et al. | 502/304 |
| 6,309,758 B1 | 10/2001 | Schmidt | 428/570 |
| 6,358,881 B1 | 3/2002 | Peters et al. | 502/304 |
| 6,376,708 B1 | 4/2002 | Morgenstern et al. | 562/538 |
| 6,379,536 B1 * | 4/2002 | Peters et al. | 208/120.01 |
| 6,380,119 B1 | 4/2002 | Grosch et al. | 502/49 |
| 6,395,403 B2 | 5/2002 | Schmidt | 428/570 |
| 6,413,898 B1 * | 7/2002 | Faber et al. | 502/64 |
| 6,471,924 B1 | 10/2002 | Feeley | 423/213.5 |
| 6,479,421 B1 | 11/2002 | Vierheilig | 502/84 |
| 6,492,297 B1 | 12/2002 | Sung | 502/304 |
| 6,514,470 B1 | 2/2003 | Ott et al. | 423/239.1 |
| 6,528,031 B1 | 3/2003 | Park et al. | 423/239.2 |
| 6,538,169 B1 | 3/2003 | Pittman | 585/653 |
| 6,558,533 B2 | 5/2003 | Schmidt et al. | 208/244 |
| 6,569,394 B2 * | 5/2003 | Fischer et al. | 423/239.2 |
| 2001/0002426 A1 | 5/2001 | Mohr et al. | 585/407 |
| 2001/0016184 A1 | 8/2001 | Campbell et al. | 423/244.06 |
| 2002/0013228 A1 | 1/2002 | Matsumoto et al. | 502/325 |
| 2002/0016259 A1 | 2/2002 | Tsao | 502/324 |
| 2002/0022573 A1 | 2/2002 | Tanada et al. | 502/344 |
| 2002/0022574 A1 | 2/2002 | Tanada et al. | 502/527.12 |
| 2002/0037808 A1 | 3/2002 | Ostgard et al. | 502/301 |
| 2002/0038051 A1 | 3/2002 | Ostgard et al. | 562/538 |
| 2002/0039550 A1 | 4/2002 | Sindlinger et al. | 423/239.2 |
| 2002/0049132 A1 | 4/2002 | Jan et al. | 502/60 |
| 2002/0061813 A1 | 5/2002 | Wang et al. | 502/73 |
| 2002/0082159 A1 | 6/2002 | Grosch et al. | 502/38 |
| 2002/0082460 A1 | 6/2002 | Verduijn et al. | 585/475 |
| 2002/0094314 A1 | 7/2002 | Miyadera et al. | 423/239.1 |
| 2002/0094932 A1 | 7/2002 | Faber et al. | 502/74 |
| 2002/0120169 A1 | 8/2002 | Spagnol et al. | 568/316 |
| 2002/0139112 A1 | 10/2002 | Onodera et al. | 60/286 |
| 2002/0160905 A1 | 10/2002 | Loyalka et al. | 502/60 |
| 2002/0183191 A1 | 12/2002 | Faber et al. | 502/63 |
| 2002/0187098 A1 | 12/2002 | Pinnavaia et al. | 423/702 |
| 2002/0189973 A1 | 12/2002 | Henry et al. | 208/74 |
| 2002/0192155 A1 | 12/2002 | Sterte et al. | 423/700 |
| 2003/0019794 A1 | 1/2003 | Schmidt et al. | 208/244 |
| 2003/0040425 A1 | 2/2003 | Huang et al. | 502/64 |
| 2003/0044330 A1 | 3/2003 | Andorf et al. | 422/177 |
| 2003/0073566 A1 * | 4/2003 | Marshall et al. | 502/64 |
| 2003/0098259 A1 | 5/2003 | Kelkar et al. | 208/120.01 |
| 2003/0115859 A1 | 6/2003 | Deeba | 60/297 |
| 2003/0165415 A1 | 9/2003 | Ott et al. | 423/239.2 |
| 2003/0181324 A1 | 9/2003 | Hotta | 502/262 |
| 2003/0181330 A1 | 9/2003 | Nguyen | |
| 2004/0031727 A1 | 2/2004 | O'Conner et al. | 208/111.35 |
| 2004/0072675 A1 | 4/2004 | Kelkar et al. | 502/63 |
| 2004/0086442 A1 | 5/2004 | Vierheilig | 423/239.1 |
| 2004/0262197 A1 | 12/2004 | McGregor et al. | |

FOREIGN PATENT DOCUMENTS

| | | | |
|---|---|---|---|
| ES | 2181844 | 3/2003 | |
| ES | 2298282 | 5/2008 | |
| WO | 02/38700 | 5/2002 | C10G 11/05 |
| WO | 03/045547 | 6/2003 | B01J 29/06 |
| WO | 03046112 | 6/2003 | C10G 11/18 |
| WO | 2004014793 | 2/2004 | C01B 21/00 |
| WO | 2004/033091 | 4/2004 | B01J 23/89 |
| WO | 2005/005578 | 1/2005 | C10G 11/18 |

OTHER PUBLICATIONS

G. W. Young, G.D. Weatherbee, and S.W. Davey, "Simulating Commercial FCCU Yields With The Davison Circulating Riser (DCR) Pilot Plant Unit," National Petroleum Refiners Association (NPRA) Paper AM8.8-52.

J.S. Magee and M.M. Mitchell, Jr. Eds. Studies In Surface Science and Catalysis vol. 76, Chapter 8, pp. 257-292, Elsevier Science Publishers B.V., Amsterdam 1993, ISBN 0-444-89037-8 ; G.W. Young, "Realistic Assessment of FCC Catalyst Performance in the Laboratory," in Fluid Catalytic Cracking: Science and Technology.

* cited by examiner

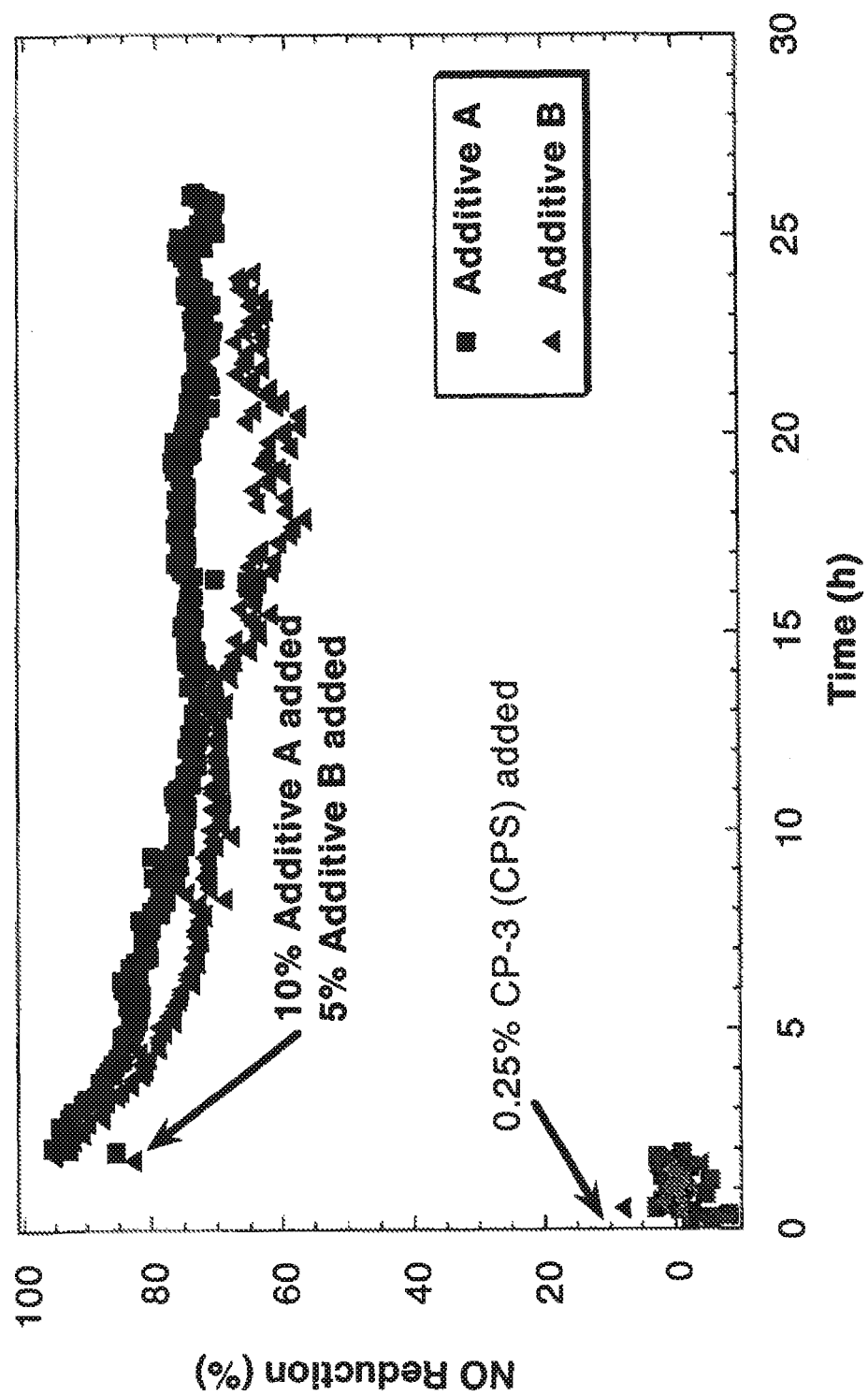

FERRIERITE COMPOSITION FOR REDUCING $NO_x$ EMISSIONS DURING FLUID CATALYTIC CRACKING

This application is a divisional of U.S. patent application Ser. No. 10/909,706, filed Aug. 2, 2004, which is a continuation in part application of U.S. patent application Ser. No. 10/702,240, filed Nov. 6, 2003 now abandoned.

This application is related to U.S. patent application Ser. No. 11/918,086, filed Oct. 8, 2007.

FIELD OF THE INVENTION

The present invention relates to $NO_x$ reduction compositions and the method of use thereof to reduce $NO_x$ emissions in refinery processes, and specifically in fluid catalytic cracking (FCC) processes. More particularly, the present invention relates to $NO_x$ reduction compositions and their method of use to reduce the content of $NO_x$ off gases released from a fluid catalytic cracking unit (FCCU) regenerator during the FCC process without a substantial change in hydrocarbon conversion or the yield of valuable cracked products.

BACKGROUND OF THE INVENTION

In recent years there has been an increased concern in the United States and elsewhere about air pollution from industrial emissions of noxious oxides of nitrogen, sulfur and carbon. In response to such concerns, government agencies have placed limits on allowable emissions of one or more of these pollutants, and the trend is clearly in the direction of increasingly stringent regulations.

$NO_x$, or oxides of nitrogen, in flue gas streams exiting from fluid catalytic cracking (FCC) regenerators is a pervasive problem. Fluid catalytic cracking units (FCCU) process heavy hydrocarbon feeds containing nitrogen compounds, a portion of which is contained in the coke on the catalyst as it enters the regenerator. Some of this coke-nitrogen is eventually converted into $NO_x$ emissions, either in the FCC regenerator or in a downstream CO boiler. Thus, all FCCUs processing nitrogen-containing feeds can have a $NO_x$ emissions problem due to catalyst regeneration.

In the FCC process, catalyst particles (inventory) are continuously circulated between a catalytic cracking zone and a catalyst regeneration zone. During regeneration, coke deposited on the cracking catalyst particles in the cracking zone is removed at elevated temperatures by oxidation with oxygen containing gases such as air. The removal of coke deposits restores the activity of the catalyst particles to the point where they can be reused in the cracking reaction. In general, when coke is burned with a deficiency of oxygen, the regenerator flue gas has a high $CO/CO_2$ ratio and a low level of $NO_x$, but when burned with excess oxygen, the flue gas has a high level of $NO_x$ and a reduced CO content. Thus, CO and $NO_x$, or mixtures of these pollutants are emitted with the flue gas in varying quantities, depending on such factors as unit feed rate, nitrogen content of the feed, regenerator design, mode of operation of the regenerator, and composition of the catalyst inventory.

Various attempts have been made to limit the amount of $NO_x$ gases emitted from the FCCU by treating the $NO_x$ gases after their formation, e.g., post-treatment of $NO_x$ containing gas streams as described in U.S. Pat. Nos. 4,434,147, 4,778,664, 4,735,927, 4,798,813, 4,855,115, 5,413, 699, and 5,547,648.

Another approach has been to modify the operation of the regenerator to partial burn and then treat the $NO_x$ precursors in the flue gas before they are converted to $NO_x$, e.g., U.S. Pat. Nos. 5,173,278, 5,240,690, 5,372,706, 5,413,699, 5,705,053, 5,716,514, and 5,830,346.

Yet another approach has been to modify the operation of the regenerator as to reduce $NO_x$ emissions, e.g., U.S. Pat. No. 5,382,352, or modify the CO combustion promoter used, e.g., U.S. Pat. Nos. 4,199,435, 4,812,430, and 4,812, 431. Enrichment of air with oxygen in a regenerator operating in partial burn mode has also been suggested, e.g., U.S. Pat. No. 5,908,804.

Additives have also been used in attempts to deal with $NO_x$ emissions. U.S. Pat. Nos. 6,379,536, 6,280,607, 6,129, 834 and 6,143,167 disclose the use of $NO_x$ removal compositions for reducing $NO_x$ emissions from the FCCU regenerator. U.S. Pat. Nos. 6,358,881 and 6,165,933 also disclose a $NO_x$ reduction composition, which promotes CO combustion during the FCC catalyst regeneration process step while simultaneously reducing the level of $NO_x$ emitted during the regeneration step. $NO_x$ reduction compositions disclosed by these patents may be used as an additive which is circulated along with the FCC catalyst inventory, or incorporated as an integral component of the FCC catalyst.

U.S. Pat. Nos. 4,973,399 and 4,980,052 disclose reducing emissions of $NO_x$ from the regenerator of the FCCU by incorporating into the circulating inventory of cracking catalyst separate additive particles containing a copper-loaded zeolite.

Many additive compositions heretofore used to control $NO_x$ missions have typically caused a significant decrease in hydrocarbon conversion or the yield of valuable cracked products, e.g., gasoline, light olefins and liquefied petroleum gases (LPGs), while increasing the production of coke. It is a highly desirable characteristic for $NO_x$ additives added to the FCCU not to affect the cracked product yields or change the overall unit conversion. The operation of the FCCU is typically optimized based on the unit design, feed and catalyst, to produce a slate of cracked products, and maximize refinery profitability. This product slate is based on the value model of the specific refinery. For example, during the peak summer driving season many refiners want to maximize gasoline production, while during the winter season refiners may want to maximize heating oil production. In other cases a refinery may find it profitable to produce light olefins products that can be sold in the open market or used in an associated petrochemical plant as feedstocks.

When a $NO_x$ reduction additive increases coke production, the FCCU may have insufficient air capacity to burn the extra coke and may result in a lower feed throughput in the unit. If the additive increases the production of low value dry gas, the production of more valuable products may decrease. An increase in dry gas may exceed the ability of the unit to handle it, thus forcing a reduction of the amount of feed processed. While an additive that increases light olefins production may be desirable if the refinery values these products and the unit has the equipment necessary to process the extra light hydrocarbons, the additive may, however, reduce profitability if the refinery's goal is to maximize gasoline production. Light olefins are typically made in the FCCU at the expense of gasoline production. Even an additive which increases unit conversion may be undesirable if it affects product yields, causes the unit to reach an equipment limitation, and/or decreases the amount of feed that can be processed.

Consequently, any change to the FCCU that affects the product slate or changes the ability to process feed at the desired rate can be detrimental to the refinery profitability. Therefore, there exists a need for $NO_x$ control compositions which do not significantly affect product yields and overall unit conversion.

SUMMARY OF THE INVENTION

It has now been discovered that the incorporation of a ferrierite zeolite component with a catalytically cracking catalyst inventory, in particular a cracking catalyst inventory containing an active Y-type zeolite, being circulated throughout a fluid catalytic cracking unit (FCCU) during a fluid catalytic cracking (FCC) process provides superior $NO_x$ control performance without substantially changing or affecting the hydrocarbon conversion or the yield of cracked petroleum products produced during the FCC process.

In accordance with the present invention, novel $NO_x$ reduction compositions are provided. Typically, the $NO_x$ reduction compositions comprise a particulate composition containing particles of ferrierite zeolite. The ferrierite zeolite may be added as a separate additive particle to a circulating inventory of the cracking catalyst or incorporated directly into the Y-type zeolite containing cracking catalyst as an integral component of the catalyst. In a preferred embodiment of the invention, the ferrierite zeolite are separate additive particles bound with an inorganic binder. The binder preferably comprises silica, alumina or silica alumina. Preferably, the ferrierite zeolite is exchanged with hydrogen, ammonium, alkali metal and combinations thereof. The preferred alkali metal is sodium, potassium and combinations thereof.

In one aspect of the invention, novel ferrierite zeolite-containing $NO_x$ reduction compositions are provided which are added to a circulating inventory of the catalytic cracking catalyst as a separate admixture of particles to reduce $NO_x$ emissions released from the FCCU regenerator during the FCC process.

In another aspect of the invention, novel $NO_x$ reduction compositions are provided which comprise ferrierite zeolite incorporated as an integral component of the FCC catalyst, preferably containing a Y-type zeolite active component.

In yet another aspect of the invention, novel $NO_x$ reduction compositions are provided which compositions reduce $NO_x$ emissions from the FCCU regenerator during the FCC process while substantially maintaining hydrocarbon conversion and the yield of cracked petroleum products and minimizing an increase in the production of coke.

It is another aspect of the present invention to provide a process for the reduction of the content of $NO_x$ in the off gas of the FCCU regenerator during the FCC process using $NO_x$ reduction compositions in accordance with the present invention.

Another aspect of the invention is to provide improved FCC processes for the reduction of the content of $NO_x$ in the off gases of the FCCU regenerator without substantially affecting hydrocarbon conversion or the yield of petroleum products produced during the FCC process.

These and other aspects of the present invention are described in further detail below.

BRIEF DESCRIPTION OF THE WINGS

The FIGURE is a graphic representation of the effectiveness of Additive A and Additive B, prepared in EXAMPLES 1 and 2, respectively, to reduce $NO_x$ emissions from a DCR regenerator versus time on stream, when the additives are blended with a commercially available cracking catalyst (SUPERNOVA®-DMR+, obtained from Grace Davison, Columbia, Md.), which contains 0.25 weight percent of a platinum promoter, CP-3® (obtained from Grace Davison, Columbia, Md.) and which was deactivated using the Cyclic Propylene Steaming procedure as described in EXAMPLE 3.

DETAILED DESCRIPTION OF THE INVENTION

Although several nitrogen oxides are known which are relatively stable at ambient conditions, for purposes of the present invention, $NO_x$ will be used herein to represent nitric oxide, nitrogen dioxide (the principal noxious oxides of nitrogen) as well as $N_2O_4$, $N_2O_5$ and mixtures thereof.

The present invention encompasses the discovery that the use of ferrierite zeolite containing $NO_x$ reduction compositions in combination with a fluid catalytic cracking (FCC) catalyst, preferably a catalyst comprising an active Y-type zeolite, is very effective for the reduction of $NO_x$ emissions released from the FCCU regenerator under FCC process conditions without a substantial change in hydrocarbon feed conversion or the yield of cracked products. The $NO_x$ reduction compositions typically comprise a particulate composition containing particles of ferrierite zeolite. In a preferred embodiment of the invention, the ferrierite particles are bound with an inorganic binder. The novel ferrierite zeolite-containing $NO_x$ reduction compositions may be added to the circulating inventory of the catalytic cracking catalyst as a separate particle additive or incorporated as an integral component into the cracking catalyst.

For purposes of the present invention, the phrase "a substantial change in hydrocarbon feed conversion or the yield of cracked products" is defined herein to mean in the alternative, (i) less than a 50% relative change, preferably less than a 30% relative change and most preferably less than a 15% relative change in the yield of LPG (liquefied petroleum gas) as compared to the baseline yield of the same or substantially the Same product; or (ii) less than a 30% relative change, preferably less than a 20% relative change and most preferably less than a 10% relative change in the yield of LCO (light cycle oils), bottoms and gasoline in combination with LPG as compared to the baseline yield of the same or substantially the same products; or (iii) less than a 10% relative change, preferably less than a 6.5% relative change and most preferably less than a 5% relative change in the hydrocarbon feed conversion as compared to the baseline conversion. The conversion is defined as 100% times (1-bottoms yield—LCO yield). When the $NO_x$ reduction composition is used as a separate additive, the baseline is the mean conversion or yield of a product in the FCCU, operating with the same or substantially the same feed and under the same or substantially the same reaction and unit conditions, but before the additive of the present invention is added to the catalyst inventory. When the $NO_x$ reduction composition is integrated or incorporated into the cracking catalyst particles to provide an integral $NO_x$ reduction catalyst system, a significant change in the hydrocarbon conversion or yield of cracked products is determined using a baseline defined as the mean conversion or yield of a product in the same or substantially the same FCCU operating with the same or substantially the same feed, under the same or substantially the same reaction and unit conditions, and with a cracking catalyst inventory comprising the same or substantially the same cracking catalyst composition as that containing the $NO_x$ reduction composition, except that the $NO_x$ reduction composition is replaced in the cracking catalyst with a matrix component such as kaolin or other filler. The percent changes specified above are derived from statistical analysis of DCR operating data.

Any ferrierite zeolite is useful to prepare the $NO_x$ reduction compositions of the invention. However, it is preferred that the ferrierite zeolite has a surface area of at least 100 $m^2/g$, more preferably at least 200 $m^2/g$ and most preferably at least 300 $m^2/g$ and a $SiO_2$ to $Al_2O_3$ molar ratio of less than 500, preferably less than 250, most preferably, less than 100. In one embodiment of the invention, the ferrierite zeolite is exchanged with a material selected from the group consisting of hydrogen, ammonium, alkali metal and combinations thereof, prior to incorporation into the binder or FCC catalyst. The preferred alkali metal is one selected from the group consisting of sodium, potassium and mixtures thereof.

Optionally, the ferrierite zeolite may contain stabilizing amounts, e.g., up to about 25 weight percent, of a stabilizing metal (or metal ion), preferably incorporated into the pores of the zeolite. Suitable stabilizing metals include, but are not limited to, metals selected from the group consisting of Groups IIA, IIIB, IVB, VB, VIB, VIIB, VIII, IIB, IIIA, IVA, VA, the Lanthanide Series of The Periodic Table, Ag and mixtures thereof. Preferably, the stabilizing metals are selected from the group consisting of Groups IIIB, IIA, IIB, IIIA and the Lanthanide Series of the Periodic Table, and mixtures thereof. Most preferably, the stabilizing metals are selected from the group consisting of lanthanum, aluminum, magnesium, zinc, and mixtures thereof. The metal may be incorporated into the pores of the ferrierite zeolite by any method known in the art, e.g., ion exchange, impregnation or the like. For purposes of this invention, the Periodic Table referenced herein above is the Periodic Table as published by the American Chemical Society.

The amount of ferrierite zeolite used in the $NO_x$ reduction compositions of the invention will vary depending upon several factors, including but not limited to, the mode of combining the ferrierite zeolite with the catalytic cracking catalyst and the type of cracking catalyst used. In one embodiment of the invention, the $NO_x$ reduction compositions of the invention are separate catalyst/additive compositions and comprise a particulate composition formed by binding particles of a ferrierite zeolite with a suitable inorganic binder. Generally, the amount of ferrierite zeolite present in the particulate $NO_x$ reduction compositions is at least 10, preferably at least 30, most preferably at least 40 and even more preferably at least 50, weight percent based on the total weight of the composition. Typically, the particulate catalyst/additive composition of the invention contains from about 10 to about 85, preferably from about 30 to about 80, most preferably, from about 40 to about 75, weight percent of ferrierite zeolite based on the total weight of the catalyst/additive composition.

Binder materials useful to prepare the particulate compositions of the invention include any inorganic binder which is capable of binding ferrierite zeolite powder to form particles having properties suitable for use in the FCCU under FCC process conditions. Typical inorganic binder materials useful to prepare compositions in accordance with the present invention include, but are not limited to, alumina, silica, silica alumina, aluminum phosphate and the like, and mixtures thereof. Preferably, the binder is selected from the group consisting of alumina, silica, silica alumina. More preferably, the binder comprises alumina. Even more preferably, the binder comprises an acid or base peptized alumina. Most preferably, the binder comprises an alumina sol, e.g., aluminum chlorohydrol. Generally, the amount of binder material present in the particular $NO_x$ reduction compositions comprises from about 5 to about 50 weight percent, preferably from about 10 to about 30 weight percent, most preferably from about 15 to about 25 weight percent, of the $NO_x$ reduction composition of the invention.

Additional materials optionally present in the compositions of the present invention include, but are not limited to, fillers (e.g., kaolin clay) or matrix materials (e.g., alumina, silica, silica alumina, yttria, lanthana, ceria, neodyrnia, samaria, europia, gadolinia, titania, zirconia, praseodymia and mixtures thereof). When used, the additional materials are used in an amount which does not significantly adversely affect the performance of the compositions to reduce $NO_x$ emissions released from the FCCU regenerator under FCC conditions, the hydrocarbon feed conversion or the product yield of the cracking catalyst. In general the additional materials will comprise no more than about 70 weight percent of the compositions. It is preferred, however, that the compositions of the invention consist essentially of ferrierite and an inorganic binder.

Particulate $NO_x$ reduction compositions of the invention should have a particle size sufficient to permit the composition to be circulated throughout the FCCU simultaneously with the inventory of cracking catalyst during the FCC process. Typically the composition of the invention will have a mean particle size of greater than 45 µm. Preferably, the mean particle size is from about 50 to about 200 µm, most preferably from about 55 to about 150 µm, even more preferred from about 60 to about 120 µm. The compositions of the invention typically have a Davison attrition index (DI) value of less than about 50, preferably less than about 20, most preferably less than about 15.

While the present invention is not limited to any particular process of preparation, typically the particulate $NO_x$ reduction compositions of the invention are prepared by forming an aqueous slurry containing the ferrierite zeolite, optional zeolite components, the inorganic binder and optional matrix materials, in an amount sufficient to provide at least 10.0 weight percent of ferrierite zeolite and at least 5.0 weight percent of binder material in the final $NO_x$ reduction composition and, thereafter, spray drying the aqueous slurry to form particles. The spray-dried particles are optionally dried at a sufficient temperature for a sufficient time to remove volatiles, e.g., at about 90° C. to about 320° C. for about 0.5 to about 24 hours. In a preferred embodiment of the invention, the ferrierite zeolite containing aqueous slurry is milled prior to spray-drying to reduce the mean particle size of materials contained in the slurry to 10 µm or less, preferably 5 µm or less, most preferably 3 µm or less. The aqueous slurry containing ferrierite zeolite may be milled prior to or after incorporation of the binder and/or matrix materials as desired.

The spray-dried composition may be calcined at a temperature and for a time sufficient to remove volatiles and provide sufficient hardness to the binder for use in the FCCU under FCC process conditions, preferably from about 320° C. to about 900° C. from about 0.5 to about 6 hours.

Optionally, the dried or calcined composition is washed or exchanged with an aqueous solution of ammonia or ammonium salt (e.g., ammonium sulfate, nitrate, chloride, carbonate, phosphate and the like), or an inorganic or organic acid (e.g., sulfuric, nitric, phosphoric, hydrochloric, acetic, formic and the like) to reduce the amount of alkaline metals, e.g. sodium or potassium, in the finished product.

Particulate $NO_x$ reduction compositions of the invention are circulated in the form of separate particle additives along with the main cracking catalyst throughout the FCCU. Generally, the catalyst/additive composition is used in an amount of at least 0.1 weight percent of the FCC catalyst inventory. Preferably the amount of the catalyst/additive composition used ranges from about 0.1 to about 75 weight percent, most preferably from about 1 to about 50 weight percent of the FCC catalyst inventory. Separate particle catalyst/additive compositions of the invention may be added to the FCCU in the conventional manner, e.g., with make-up catalyst to the regenerator or by any other convenient method.

In a second embodiment of the invention, the ferrierite zeolite is integrated or incorporated into the cracking catalyst particles themselves to provide an integral $NO_x$ reduction catalyst system. In accordance with this embodiment of the invention, the ferrierite zeolite may be added to the catalyst at any stage during catalyst manufacturing prior to spray drying the cracking catalyst slurry to obtain the fluid cracking catalyst, regardless of any additional optional or required processing steps needed to finish the cracking catalyst preparation. Without intending to limit the incorporation of the ferrierite, and any optional zeolite components, within the cracking catalyst to any specific method of cracking catalyst manufacturing, typically the ferrierite zeolite, any additional zeolites, the cracking catalyst zeolite, usually USY or REUSY-type, and any matrix materials are slurried in water. The slurry is milled to reduce the mean particle size of solids in the slurry to less than 10 μm, preferably to less than 5 μm, most preferably less than 3 μm. The milled slurry is combined with a suitable inorganic binder, i.e., a silica sol binder, and an optional matrix material, e.g. clay. The resulting slurry is mixed and spray-dried to provide a catalyst material. The spray-dried catalyst is optionally washed using an aqueous solution of ammonium hydroxide, an ammonium salt, an inorganic or organic acid, and water to remove the undesirable salts. The washed catalyst may be exchanged with a water soluble rare-earth salt, e.g., rare-earth chlorides, nitrates and the like.

Alternatively, the ferrierite zeolite, optional additional zeolites, the cracking catalyst zeolite, any matrix materials, a rare-earth water soluble salt, clay and alumina sol binder are slurried in water and blended. The slurry is milled and spray-dried. The spray-dried catalyst is calcined at about 250° C. to about 900° C. The spray-dried catalyst may then optionally be washed using an aqueous solution of ammonium hydroxide, an ammonium salt, an inorganic or organic acid, and water to remove the undesirable salts. Optionally, the catalyst may be exchanged with a water-soluble rare-earth salt after it has been washed, by any of the methods known in the art.

When integrated into the FCC catalyst particles, the ferrierite zeolite compound typically represents at least about 0.1 weight percent of the FCC catalyst particle. Preferably, the amount of the ferrierite zeolite used ranges from about 0.1 to about 60 weight percent, most preferably from about 1 to about 40 weight percent, of the FCC catalyst particles.

The integrated FCC catalyst will typically comprise the ferrierite zeolite along with the cracking catalyst zeolite, inorganic binder materials and optionally, matrix, fillers, and other additive components such as metals traps (for example, traps for Ni and V) to make up the cracking catalyst. The cracking catalyst zeolite, usually a Y, USY or REUSY-type, provides the majority of the cracking activity and is typically present in a range from about 10 to about 75, preferably from about 15 to about 60 and most preferably from about 20 to about 50 weight percent based on the total weight of the composition. Inorganic binder materials useful to prepare integrated catalyst compositions in accordance with the present invention include, any inorganic material capable of binding the components of the integrated catalyst to form particles having properties suitable for use in the FCCU under FCC process conditions. Typically, the inorganic binder materials include, but are not limited to, alumina, silica, silica alumina, aluminum phosphate and the like, and mixtures thereof. Preferably, the binder is selected from the group consisting of alumina, silica, silica alumina. Generally, the amount of binder material present in the integrated catalyst composition is less than 50 weight percent, based on the total weight of the catalyst composition. Preferably, the amount of binder material present in the integrated catalyst composition ranges from about 5 to about 45 weight percent, most preferably from about 10 to about 30 weight percent and even more preferably from about 15 to about 25 weight percent, based on the total weight of the composition.

The matrix materials optionally present in the integrated catalyst compositions of the present invention include, but are not limited to alumina, silica alumina, rare earth oxides such as lanthana, transition metal oxides such as titania, zirconia, and manganese oxide, Group IIA oxides such as magnesium and barium oxides, clays such as kaolin, and mixtures thereof. The matrix or fillers may be present in the integral catalyst in the amount of less than 50 weight percent based on the total weight of the composition. Preferably, the matrix and fillers, if any, are present in an amount ranging from about 1 to about 45 weight present based on the total weight of the catalyst composition.

The particle size and attrition properties of the integral catalyst affect fluidization properties in the unit and determine how well the catalyst is retained in the commercial FCC unit. The integral catalyst composition of the invention typically has a mean particle size of about 45 to about 200 μm, more preferably from about 50 μm to about 150 μm. The attrition properties of the integral catalyst, as measured by the Davison Attrition Index (DI), have a DI value of less than 50, more preferably less than 20 and most preferably less than 15.

In a preferred embodiment of the invention, the FCC cracking catalyst contains a Y-type zeolite. The ferrierite zeolite may be added as a separate additive particle to a circulating inventory of the cracking catalyst or incorporated directly into the Y-type zeolite containing cracking catalyst as an integral component of the catalyst. In either case, it is preferred that ferrierite zeolite is present in the final composition in an amount sufficient to provide in the total catalyst inventory a ratio of ferrierite zeolite to Y-type zeolite of less than 2, preferably less than 1.

It is also within the scope of the invention to include additional zeolite components in the ferrierite zeolite containing $NO_x$ reduction compositions of the invention. The additional zeolite component may be any zeolite which does not adversely affect the $NO_x$ reduction performance or cause a substantial change in hydrocarbon conversion or cracked product yields during the FCC process. Preferably, the additional zeolite component is a zeolite having a pore size ranging from about 3 to about 7.2 Angstroms with a $SiO_2$ to $Al_2O_3$ molar ratio of less than about 500, preferably less than 250. Preferably, the additional zeolite component is a zeolite selected from the group consisting of ZSM-5, ZSM-11, beta, MCM-49, mordenite, MCM-56, Zeolite-L, zeolite Rho, errionite, chabazite, clinoptilolite, MCM-22, MCM-35, MCM-61, Offretite, A, ZSM-12, ZSM-23, ZSM-18, ZSM-22, ZSM-35, ZSM-57, ZSM-61, ZK-5, NaJ, Nu-87, Cit-1, SSZ-35, SSZ-48, SSZ-44, SSZ-23, Dachiardite, Merlinoite, Lovdarite, Levyne, Laumontite, Epistilbite, Gmelonite, Gismondine, Cancrinite, Brewsterite, Stilbite, Paulingite, Goosecreekite, Natrolite or mixtures thereof. Most preferably the additional zeolite component is selected from the group consisting of ZSM-5, ZSM-11, beta, MCM-49, mordenite, MCM-56, Zeolite-L, zeolite Rho, errionite, chabazite, clinoptilolite, MCM-22, MCM-35, Offretite, A, ZSM-12 and mixtures thereof. The additional zeolite component is used in any amount that does not significantly adversely affect the performance of the $NO_x$ reduction compositions to reduce $NO_x$ emissions and substantially maintain the hydrocarbon conversion or the product yields of the cracking catalyst relative to the use of the cracking catalyst without the catalyst/additive composition. Typically, the additional zeolite component is used in an amount ranging from about 1 to about 80, preferably from about 10 to about 70, weight percent of the catalyst/additive composition. Where the $NO_x$ reduction composition is used as an integral component of the catalyst, the additional zeolite component is preferably used in an amount ranging from about 0.1 to about 60, most preferably from about 1 to about 40, weight percent of the catalyst composition.

Somewhat briefly, the FCC process involves the cracking of heavy hydrocarbon feedstocks to lighter products by contact of the feedstock in a cyclic catalyst recirculation cracking process with a circulating fluidizable cracking catalyst inventory consisting of particles having a mean size ranging from about 50 to about 150 μm, preferably from about 60 to about 120 μm. The catalytic cracking of these relatively high molecular weight hydrocarbon feedstocks results in the production of a hydrocarbon product of lower molecular weight. The significant steps in the cyclic FCC process are:

(i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;

(ii) the effluent is discharged and separated, normally in one or more cyclones, into a vapor phase rich in cracked product and a solids rich phase comprising the spent catalyst;

(iii) the vapor phase is removed as product and fractionated in the FCC main column and its associated side columns to form gas and liquid cracking products including gasoline;

(iv) the spent catalyst is stripped, usually with steam, to remove occluded hydrocarbons from the catalyst, after which the stripped catalyst is oxidatively regenerated in a catalyst regeneration zone to produce hot, regenerated catalyst which is then recycled to the cracking zone for cracking further quantities of feed.

Conventional FCC catalysts include, for example, zeolite based catalysts with a faujasite cracking component as described in the seminal review by Venuto and Habib, *Fluid Catalytic Cracking with Zeolite Catalysts*, Marcel Dekker, New York 1979, ISBN 0-8247-6870-1, as well as in numerous other sources such as Sadeghbeigi, *Fluid Catalytic Cracking Handbook*, Gulf Publ. Co. Houston, 1995, ISBN 0-88415-290-1. Preferably, the FCC catalyst is a catalyst comprising a Y-type zeolite active cracking component. In a particularly preferred embodiment of the invention, the FCC catalysts consist of a binder, usually silica, alumina, or silica alumina, a Y-type zeolite active component, one or more matrix aluminas and/or silica aluminas, and fillers such as kaolin clay. The Y-type zeolite may be present in one or more forms and may have been ultra stabilized and/or treated with stabilizing cations such as any of the rare-earths.

Typical FCC processes are conducted at reaction temperatures of 480° C. to 600° C. with catalyst regeneration temperatures of 600° C. to 800° C. As it is well known in the art, the catalyst regeneration zone may consist of a single or multiple reactor vessels. The compositions of the invention may be used in FCC processing of any typical hydrocarbon feedstock. Suitable feedstocks include petroleum distillates or residuals of crude oils, which when catalytically cracked, provide either a gasoline or a gas oil product. Synthetic feeds having boiling points of about 204° C. to about 816° C., such as oil from coal, tar sands or shale oil, can also be included.

In order to remove coke from the catalyst, oxygen or air is added to the regeneration zone. This is performed by a suitable sparging device in the bottom of the regeneration zone, or if desired, additional oxygen is added to the dilute or dense phase of the regeneration zone.

$NO_x$ reduction compositions in accordance with the invention dramatically reduce, i.e., by at least 10%, preferably at least 20%, the emissions of $NO_x$ in the FCCU regenerator effluent during the catalyst regeneration, while substantially maintaining the hydrocarbon feed conversion or the yield of cracked products, e.g., gasoline and light olefins, obtained from the cracking catalyst. In some casts, $NO_x$ reduction of 90% or greater is readily achievable using the compositions and method of the invention without significantly affecting the cracked products yields or feed conversion. However, as will be understood by one skilled in the catalyst art, the extent of $NO_x$ reduction will depend on such factors as, for example, the composition and amount of the additive utilized; the design and the manner in which the catalytic cracking unit is operated, including but not limited to oxygen level and distribution of air in the regenerator, catalyst bed depth in the regenerator, stripper operation and regenerator temperature, the properties of the hydrocarbon feedstock cracked, and the presence of other catalytic additives that may affect the chemistry and operation of the regenerator. Thus, since each FCCU is different in some or all of these respects, the effectiveness of the process of the invention may be expected to vary from unit to unit. $NO_x$ reduction compositions of the invention also prevent a significant increase in the production of coke during the FCC process.

It is also within the scope of the invention that $NO_x$ reduction compositions of the invention may be used alone or in combination with one or more additional $NO_x$ reduction component to achieve $NO_x$ reduction more efficiently than the use of either of the compositions alone. Preferably, the additional $NO_x$ reduction component is a non-zeolitic material, that is, a material that contains no or substantially no (i.e., less than 5 weight percent, preferably less than 1 weight percent) zeolite.

One such class of non-zeolitic materials suitable for use in combination with the $NO_x$ reduction compositions of the invention include noble metal containing $NO_x$ reduction compositions such as disclosed and described in U.S. Pat. No. 6,660,683 the entire disclosure of which is herein incorporated by reference. Compositions in this class will typically comprise a particulate mixture of (1) an acidic metal oxide containing substantially no zeolite (preferably containing silica and alumina, most preferably containing at least 1 weight percent alumina); (2) an alkali metal (at least 0.5 weight percent, preferably about 1 to about 15 weight percent), an alkaline earth metal (at least 0.5 weight percent, preferably about 0.5 to about 50 weight percent) and mixtures thereof; (3) at least 0.1 weight percent of an oxygen storage metal oxide component (preferably ceria); and (4) at least 0.1 ppm of a noble metal component (preferably Pt, Pd, Rh, Ir, Os, Ru, Re and mixtures thereof). Preferred compositions in this class of materials comprise (1) an acidic oxide containing at least 50 weight percent alumina and substantially no zeolite; (2) at least 0.5 weight percent of an alkali metal and/or an alkaline earth metal or mixtures thereof; (3) about 1 to about 25 weight percent of an oxygen storage capable transition metal oxide or a rare-earth (preferably, ceria); and (4) at least 0.1 ppm of a noble metal selected from the group consisting of Pt, Rh, Ir, and a combination thereof, all percentages being based on the total weight of the oxidative catalyst/additive composition.

Another class of non-zeolitic materials suitable for use in combination with the $NO_x$ reduction compositions of the invention include a low $NO_x$, CO combustion promoter as disclosed and described in U.S. Pat. Nos. 6,165.933 and 6,358,881, the entire disclosure of these patents being herein incorporated by reference. Typically, the low $NO_x$ CO combustion promoter compositions comprise (1) an acidic oxide support; (2) an alkali metal and/or alkaline earth metal or mixtures thereof; (3) a transition metal oxide having oxygen storage capability; and (4) palladium. The acidic oxide support preferably contains silica alumina. Ceria is the preferred oxygen storage oxide. Preferably, the $NO_x$ reduction composition comprises (1) an acidic metal oxide support containing at least 50 weight percent alumina; (2) about 1-10 parts by weight, measured as metal oxide, of at least one alkali metal, alkaline earth metal or mixtures thereof; (3) at least 1 part by weight of $CeO_2$; and (4) about 0.01-5.0 parts by weight of Pd, all of said parts by weight of components (2)-(4) being per 100 parts by weight of said acidic metal oxide support material.

Yet another class of non-zeolitic materials suitable for use in combination with the $NO_x$ reduction compositions of the invention include $NO_x$ reduction compositions as disclosed and described in U.S. Pat. Nos. 6,280,607 B1, 6,143,167, 6,379,536 and 6,129,834, the entire disclosure of these patents being herein incorporated by reference. In general, the $NO_x$ reduction compositions comprise (1) an acidic oxide support; (2) an alkali metal and/or alkaline earth metal or mixtures thereof; (3) a transition metal oxide having oxygen storage capability; and (4) a transition metal selected from Groups IB and IIB of the Periodic Table. Preferably, the acidic oxide support contains at least 50 weight percent alumina and preferably contains silica alumina. Ceria is the preferred oxygen storage oxide. In a preferred embodiment of the invention, the $NO_x$ reduction compositions comprise (1) an acidic oxide support containing at least 50 weight percent alumina; (2) 1-10 weight percent, measured as the metal oxide, of an alkali metal, an alkaline earth metal or mixtures thereof; (3) at least 1 weight percent $CeO_2$; and (4) 0.01-5.0 parts weight percent of a transition metal, measured as metal oxide, of Cu or Ag, all parts by weight of components (2)-(4) being per 100 parts by weight of said acidic oxide support.

Another class of non-zeolitic $NO_x$ reduction materials suitable for use in combination with the $NO_x$ reduction compositions of the invention include magnesium-aluminum spinel based additives heretofore being useful for the removal of sulfur oxides from a FCC regenerator. Exemplary patents which disclose and describe this type of materials include U.S. Pat. Nos. 4,963,520, 4,957,892, 4,957,718, 4,790,982, 4,471,070, 4,472,532, 4,476,245, 4,728,635, 4,830,840, 4,904,627, 4,428,827, 5,371,055, 4,495,304, 4,642,178, 4,469,589, 4,758,418, 4,522,937, 4,472,267 and 4,495,305 the entire disclosure of said patents being herein incorporated by reference. Preferably, compositions in this class comprise at least one metal-containing spinel which includes a first metal and a second metal having a valence higher than the valence of said first metal, at least one component of a third metal other than said first and second metals and at least one component of a fourth metal other than said first, second and third metals, wherein said third metal is selected from the group consisting of Group IB metals, Group IIB metals, Group VIA metals, the rare-earth metals, the Platinum Group metals and mixtures thereof, and said fourth metal is selected from the group consisting of iron, nickel, titanium, chromium, manganese, cobalt, germanium, tin, bismuth, molybdenum, antimony, vanadium and mixtures thereof. Preferably, the metal containing spinel comprises magnesium as said first metal and aluminum as said second metal, and the atomic ratio of magnesium to aluminum in said spinel is at least about 0.17. The third metal in the spinel preferably comprises a metal selected from the group consisting of the Platinum Group metals, the rare-earth metals and mixtures thereof. The third metal component is preferably present in an amount in the range of about 0.001 to about 20 weight percent, calculated as elemental third metal, and said fourth metal component is present in an amount in the range of about 0.001 to about 10 weight percent, calculated as elemental fourth metal.

Other non-zeolitic materials useful in combination with the $NO_x$ reduction additives of the invention include, but are not limited to, zinc based catalysts such as disclosed and described in U.S. Pat. No. 5,002,654; antimony based $NO_x$ reduction additives such as described and disclosed in U.S. Pat. No. 4,988,432; perovskite-spinel $NO_x$ reduction additives such as described and disclosed in U.S. Pat. Nos. 5,364,517 and 5,565,181; hydrotalcite catalyst and additive compositions such as described and disclosed, for example, in U.S. Pat. Nos. 4,889,615, 4,946,581, 4,952,382, 5,114, 691, 5,114,898, 6,479,421 B1 and PCT International Publication No. WO 95/03876; and low $NO_x$ promoter additive compositions such as described, for example in U.S. Pat. No. 4,290,878; the entire disclosure of each patent being herein incorporated by reference.

It is also within the scope of the invention to use the $NO_x$ reduction compositions of the invention in combination with $NO_x$ removal compositions as disclosed and described in PCT International Publication Number WO 03/046112 A1 and PCT International Publication No, WO 2004/033091A1, the entire disclosures of which are herein incorporated by reference. Such $NO_x$ removal composition generally comprises (i) an acidic oxide support, (ii) cerium oxide, (iii) a lanthanide oxide other than ceria and (iv) optionally, at least one oxide of a transition metal selected from Groups IB and IIB of the Periodic Table, noble metals, and mixtures thereof.

When used, the additional non-zeolitic $NO_x$ reduction compositions are used in an amount sufficient to provide increased $NO_x$ reduction when compared to the use of the ferrierite $NO_x$ reduction compositions alone. Typically, the additional non-zeolitic compositions are used in all amount up to about 50 weight percent of the FCC catalyst inventory. Preferably, the non-zeolitic composition is used in an amount up to about 30 weight percent, most preferably up to about 10 weight percent of the FCC catalyst inventory. The additional $NO_x$ reduction composition may be blended with the FCC catalyst inventory as a separate particle additive. Alternatively, the additional $NO_x$ reduction composition may be incorporated into the FCC catalyst as an integral component of the catalyst.

It is also contemplated within the scope of the present invention that $NO_x$ reduction compositions in accordance with the present invention may be used in combination with other additives conventionally used in the FCC process, e.g., $SO_x$ reduction additives, gasoline-sulfur reduction additives, CO combustion promoters, additives for the production of light olefins, and the like.

The scope of the invention is not in any way intended to be limited by the examples set forth below. The examples include the preparation of catalyst/additives useful in the process of the invention and the evaluation of the invention process to reduce $NO_x$ in a catalytic cracking environment. The examples are given as specific illustrations of the claimed invention. It should be understood, however, that the invention is not limited to the specific details set forth in the examples.

All parts and percentages in the examples, as well as the remainder of the specification which refers to solid compositions or concentrations, are by weight unless otherwise specified. Concentrations of gaseous mixtures are by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

Example 1

A composition comprising 40% ferrierite, 40% clay and 20% silica sol (Additive A) was prepared as follows. An aqueous slurry containing 29% ferrierite ($SiO_2/Al_2O_3=20$) was milled in a Drais mill to an average particle size of less than 2.5 μm. The milled ferrierite slurry (4160 g) was combined with 1200 g Natka clay (dry basis) and 6000 g silica sol binder (10% solids). The silica sol binder was prepared from sodium silicate and acid alum. The catalyst slurry was then spray-dried in a Bowen spray drier. The resulting spray-dried product was washed with ammonium sulfate solution, followed by water to give a catalyst with a $Na_2O$ level of less than 0.1 weight percent. The properties of the additive are shown in Table 1 below.

Example 2

A composition comprising 75% ferrierite and 25% alumina sol (Additive B) was prepared as follows. An aqueous slurry was prepared which contained 2174 g of aluminum chlorohydrol solution (23% solids), 1500 g (dry basis) of ferrierite ($SiO_2/Al_2O_3=20$, $Na_2O+K_2O<0.2$) and enough additional water to make a slurry which contained about 40% solids. The slurry was milled in a Drais mill to an average particle size of less than 2.5 μm and then spray-dried in a Bowen spray dryer. The spray-dried product was calcined for 90 minutes at 1100° F. The properties of the catalyst are shown in Table 1 below.

Example 3

Additives A and B were evaluated for their ability to reduce $NO_x$ emissions from a FCCU using the Davison Circulating Riser (DCR). The description of the DCR has been published in the following papers: G. W. Young, G. D. Weatherbee, and S. W. Davey, "Simulating Commercial FCCU Yields With The Davison Circulating Riser (DCR) Pilot Plant Unit," National Petroleum Refiners_Association (NPRA) Paper AM88-52; G. W. Young, "Realistic Assessment of FCC Catalyst Performance in the Laboratory," in Fluid Catalytic Cracking: Science and Technology, L S. Magee and M. M. Mitchell, Jr. Eds. Studies in Surface Science and Catalysis Volume 76, p. 257, Elsevier Science Publishers B.V., Amsterdam 1993, ISBN 0-444-89037-8.

The DCR was started up by charging the unit with approximately 1800 g of a commercially available cracking catalyst, SUPERNOVA®-DMR+, obtained from Grace Davison, hydrothermally deactivated in a fluidized bed reactor with 100% steam for 4 hours at 816° C.

TABLE I

Properties of Additives Made in Example 1 and Example 2

|  |  | Additive A | Additive B |
|---|---|---|---|
| TV @ 1750 F |  | 10.78 | 4.68 |
| $SiO_2$ | wt. % | — | — |
| $Al_2O_3$ | wt. % | 21.741 | 29.4 |
| $RE_2O_3$ | wt. % | 0.011 | <0.025 |
| $Na_2O$ | wt. % | 0.035 | 0.10 |
| Fe | wt. % | 0.441 | 0.1 |
| $TiO_2$ | wt. % | 0.913 | 0.0 |
|  | wt. % |  |  |
| SA | wt. % | 245 | 320 |
| Matrix | wt. % | 58 | 85 |
| Zeolite | wt. % | 187 | 235 |
| Average Particle Size | μm | 76 | 83 |

For the purposes of the evaluation, a commercial FCC feed was used as described in Table 2 below.

TABLE 2

Properties of Feed Used in DCR Tests Described in Example 3

| API Gravity @ 60° F. | 21.2 |
|---|---|
| Sulfur, wt. % | 0.206 |
| Total Nitrogen, wt. % | 0.31 |
| Basic Nitrogen, wt. % | 0.0868 |
| Conradson Carbon, wt. % | 0.3 |
| Ni, ppm | 1.5 |
| V, ppm | 2.5 |
| K Factor | 11.61 |
| Simulated Distillation, vol. %, of |  |
| 5 | 498 |
| 20 | 682 |
| 40 | 789 |
| 60 | 865 |
| 80 | 943 |
| FBP | 1265 |

The DCR was operated with 1% excess $O_2$ in the regenerator, and with the regenerator operating at 705° C. After the unit stabilized the baseline $NO_x$ emissions data were collected using an on-line Lear-Siegler $SO_2/NO_x$ Analyzer (SM8100A). Subsequently, 100 g of catalyst were injected into the DCR consisting of 4.75 g of a commercial sample of a Pt-based combustion promoter, CP-3® (obtained from Grace Davison), which had been deactivated for 20 hours at 788° C. without any added Ni or V using the Cyclic Propylene Steaming method (CPS) and 95.25 grams of hydrothermally deactivated SUPERNOVA®-DMR+. The description of the CPS method has been published in L. T. Boock, T. F. Petti, and J. A Rudesill, "Contaminant-Metal Deactivation and Metal-Dehydrogenation Effects During Cyclic Propylene Steaming of Fluid Catalytic Cracking Catalysts," Deactivation and Testing of Hydrocarbon Processing Catalysts, ACS Symposium Series 634, p. 171 (1996), ISBN 0-8412-3411-6.

After the unit was again stabilized, the $NO_x$ emissions data were collected. Thereafter, 0.525 g of the CO promoter with 210 g of Additive A, or 105 g of the same steamed deactivated cracking catalyst originally loaded into the DCR with 105 g of Additive B was added to the DCR. The results are recorded in Table 3 below. TOS is time on stream from the time of adding Pt CO combustion promoter to the unit. As shown in that table and the FIGURE, Additives A and B are effective in reducing $NO_x$ emissions from the DCR regenerator.

Table 4 shows the conversion and product yields with and without the composition of this invention. In Table 4 the means of conversion and cracked product yields were calculated using a sample of 7 baseline DCR tests. As shown in Table 4, when accounting for the expected variation from experiment to experiment, both Additives A and B are especially effective in decreasing $NO_x$ emissions without significantly affecting the cracked products yields. In particular, both overall conversion and gasoline yield do not change substantially, even though the FCC feedstock used in these experiments is a high nitrogen feed.

TABLE 3

Reduction of $NO_x$ Emissions From the Regenerator of the Davison Circulating Riser (DCR) When Using Ferrierite Zeolite Based Additives A and B

| Additive | Amount (%) | TOS (h) | Flue Gas Rate (1/h NPT) | $NO_x$ (nppm) | $NO_x$ Reduction (%) |
|---|---|---|---|---|---|
| Catalyst | | | 918 | 17 | |
| CP-3 ® CPS | 0.25 | 1.9 | 928 | 534 | |
| Additive A | 10 | 3 | 906 | 42 | 92 |
| | | 4 | 902 | 69 | 87 |
| | | 24 | 874 | 141 | 74 |
| Catalyst | | | 943 | 32 | |
| CP-3 ® CPS | 0.25 | 1.6 | 937 | 474 | |
| Additive B | 5 | 3 | 889 | 55 | 88 |
| | | 4 | 874 | 82 | 83 |
| | | 24 | 874 | 165 | 65 |

Example 4

A composition comprising 65% ferrierite, 20% Alumina Sol and 15% kaolin clay (ADDITIVE C) was prepared as follows: An aqueous slurry was prepared which contained 40.1 lbs of aluminum chlorohydrol solution (23% solids), 293 lbs (dry basis) of ferrierite ($SiO_2/Al_2O_3$=16, $Na_2O$+$K_2O$<0.2), 7.9 lbs kaolin clay (as is), and 32.5 lbs additional water, enough to make a slurry which contained about 40% solids. The slurry was milled in a Drais mill to an average particle size of less than 2.5 μm and then spray-dried in a Bowen Engineering spray drier. The spray-dried product was calcined for 60 minutes at 1100° F. The properties of the catalyst are shown in Table 5 below.

TABLE 5

Properties of Additive Made in Example 4

| | Additive C |
|---|---|
| T.V., %: | 4.76 |
| $SiO_2$, %: | 64.73 |
| $Al_2O_3$, %: | 33.004 |
| $RE_2O_3$, %: | 0.049 |
| $Na_2O$, %: | 0.135 |
| $Fe_2O_3$, %: | 0.295 |
| $TiO_2$, %: | 0.448 |
| DI: | 1.3 |
| APS, microns: | 93 |
| Surface Area, $m^2/g$: | 257 |
| ZSA, $m^2/g$: | 205 |
| MSA, $m^2/g$: | 52 |

A particulate $NO_x$ reduction composition (Additive D) was prepared as follows: A slurry was prepared from an aqueous slurry having 20% solids of a peptizable alumina (Versal 700 alumina powder obtained from La Roche Industries Inc., 99% $Al_2O_3$, 30% moisture). The alumina slurry was prepared using 31.6 lbs of the alumina. To the alumina slurry 3.87 lbs of an aqueous sodium hydroxide solution (50% NaOH) was added. Next, 10.4 lbs of cerium carbonate crystals (obtained from Rhone Poulenc, Inc., 96% $CeO_2$, 4% $La2O_3$, 50% moisture) was added to the slurry. The slurry was diluted with a sufficient amount of water to bring the solids concentration of the slurry to 12%. Finally, 3.38 lbs of

TABLE 4

Conversion and Cracked Product Yields

| Catalyst Name | Cracking Catalyst w/ 0.25% CP-3(CPS) Average of All Tests | w/ 10% Additive A TOS = 1 h | w/ 5% Additive B TOS = 3 h | w/ 5% Additive B TOS = 23 h |
|---|---|---|---|---|
| Rx Exit Temp, ° C. | 521 | 521 | 521 | 521 |
| Conversion, wt % | 58.52 | 57.16 | 58.14 | 57.97 |
| C/O RATIO | 8.72 | 8.59 | 8.69 | 8.60 |
| H2 Yield, wt % | 0.05 | 0.05 | 0.05 | 0.05 |
| Dry Gas, wt % | 2.00 | 2.08 | 2.10 | 2.03 |
| Total C3, wt % | 4.00 | 4.36 | 4.48 | 4.07 |
| C3=, wt % | 3.44 | 3.78 | 3.90 | 3.51 |
| Total C4, wt % | 7.03 | 7.04 | 7.22 | 7.26 |
| IC4, wt% | 1.66 | 1.53 | 1.62 | 1.59 |
| Total C4=, wt % | 5.00 | 5.15 | 5.24 | 5.31 |
| IC4=, wt % | 1.52 | 1.59 | 1.62 | 1.65 |
| Total LPG | 11.03 | 11.39 | 11.71 | 11.33 |
| Gasoline, wt % | 42.08 | 40.46 | 41.12 | 41.48 |
| G-Con RON EST | 93.21 | 93.12 | 93.20 | 93.12 |
| LCO, wt % | 25.93 | 25.77 | 25.40 | 25.51 |
| Bottoms, wt % | 15.55 | 17.07 | 16.45 | 16.52 |
| Coke, wt % | 3.37 | 3.17 | 3.16 | 3.13 | ion exchanged silica sol of Nalco 1140 (obtained from Nalco Chemicals Co.) was added to the slurry. The mixture was agitated to assure good mixing and then milled in a stirred media mill to reduce agglomerates to substantially less than 10 μm. The milled mixture was then spray-dried to form approximately 70 μm microspheres and thereafter calcined at approximately 650° C. to remove volatiles. The resulting material was impregnated with an aqueous solution of a Cu containing salt (e.g., CuSO$_4$) to achieve about 2% Cu on the final product, and was flash dried. The final product had the following analysis (dry basis): 7.8% SiO$_2$, 7.1% Na$_2$O, 18.5% CeO$_2$, 60.2% Al$_2$O$_3$, 1.9% Cu and BET surface area of 111 m$^2$/g.

Example 6

Additive C and a blend of Additives C and D consisting of 75% Additive C and 25% Additive D where tested in the DCR with a feedstock having the properties shown in Table 6. The unit was loaded with 1995 g of an equilibrium cracking catalyst (ECAT) having the properties as shown in Table 7 below, and 5 g of the commercially available CO combustion promoter CP-3®, which had been deactivated for 20 hours at 788° C. without any added Ni or V using the CPS method. After the unit was stabilized, the baseline NO$_x$ emissions data were collected. Subsequently, 42 g of Additive C or the blend of Additive C and D were injected into the unit along with 0.25 g of the combustion promoter, and 157.75 g of the equilibrium catalyst. The results are shown in Table 8 below. TOS is time on stream from the time of adding the Pt CO combustion promoter to the unit. As this Table shows, both Additive C and the blend of Additives C and D are effective in decreasing NO$_x$ emissions in the DCR unit regenerator. However, the blend of Additives C and D when used in the catalyst inventory in the same amount as Additive C alone is more effective in reducing NO$_x$ than Additive C.

TABLE 6

Properties of Feed Used in DCR Tests Described in Example 6

| | |
|---|---|
| API Gravity @ 60° F. | 25.5 |
| Sulfur, wt. % | 0.369 |
| Total Nitrogen, wt. % | 0.12 |
| Basic Nitrogen, wt. % | 0.05 |
| Conradson Carbon, wt. % | 0.68 |
| Fe, ppm | 4 |
| Na, ppm | 1.2 |
| K Factor | 11.94 |
| Simulated Distillation, vol. %, ° F. | |
| 5 | 513 |
| 20 | 691 |
| 40 | 782 |
| 60 | 859 |
| 80 | 959 |
| FBP | 1257 |

TABLE 7

Properties of the Equilibrium Catalyst

CHEMICAL ANALYSES:

| | | |
|---|---|---|
| SiO2 | wt. % | 49.0 |
| Al2O3 | wt. % | 46.1 |
| RE2O3 | wt. % | 1.44 |

TABLE 7-continued

Properties of the Equilibrium Catalyst

CHEMICAL ANALYSES:

| | | |
|---|---|---|
| Na2O | wt. % | 0.32 |
| SO4 | wt. % | 0.10 |
| Fe | wt. % | 0.6 |
| TiO2 | wt. % | 1.2 |
| Ni | ppm | 1060 |
| V | ppm | 1760 |
| SA | m$^2$/g | 174 |
| Zeolite | m$^2$/g | 127 |
| Matrix | m$^2$/g | 47 |
| Unit Cell | Angstroms | 24.28 |

TABLE 8

Reduction of NO$_x$ Emissions From The Regenerator Of The Davison Circulating Riser (DCR) When Using Additive C Or The Blend Of Additives C and D

| Additive | Additive Amount (%) | TOS (h) | Flue Gas Rate (1/h NPT) | NO$_x$ (nppm) | NO$_x$ Reduction (%) |
|---|---|---|---|---|---|
| Catalyst + CP-3 ® | 0.25 | 2 | 895 | 152 | |
| Additive C | 1.9 | 7 | 895 | 91 | 40 |
| | | 12 | 895 | 90 | 41 |
| Catalyst + CP-3 ® | 0.25 | 2.8 | 907 | 169 | |
| Additives C + D | 1.9 | 7.8 | 918 | 78 | 54 |
| | | 12.3 | 922 | 78 | 54 |

What is claimed is:

1. A process of reducing NO$_x$ emissions from the regeneration zone during fluid catalytic cracking of a hydrocarbon feedstock into lower molecular weight components, said process comprising
   a. contacting a hydrocarbon feedstock during a fluid catalytic cracking (FCC) process wherein NO$_x$ emissions are released from a regeneration zone of a fluid catalytic cracking unit (FCCU) operating under FCC conditions with a circulating inventory of a cracking catalyst and a separate particulate NO$_x$ reduction composition having a mean particle size of greater than 45 μm and consisting essentially of (i) at least 50 weight percent of ferrierite zeolite based on a total weight of the separate particulate NO$_x$ reduction composition, wherein the ferrierite zeolite is stabilized with at least one stabilizing metal selected from the group consisting of Groups IIA, IIIB, and IIIA, but excluding yttrium and lanthanum, and mixtures thereof, (ii) from about 5 to 50 weight percent of an inorganic binder selected from the group consisting of alumina, silica, silica alumina, aluminum phosphate and mixtures thereof; and (iii) matrix material; and
   b. reducing the amount of NO$_x$ emissions released from the regeneration zone of the FCCU as compared to the amount of NO$_x$ emissions released in the absence of the particulate NO$_x$ reduction composition.

2. The process of claim 1 wherein the cracking catalyst comprises a Y-type zeolite.

3. The process of claim 1 wherein the amount of ferrierite zeolite present in the NO$_x$ reduction composition ranges from 50 to about 85 weight percent of the composition.

4. The process of claim 3 wherein the amount of ferrierite zeolite present in the NO$_x$ reduction composition ranges from 50 to about 80 weight percent of the composition.

5. The process of claim 4 wherein the amount of ferrierite zeolite present in the $NO_x$ reduction composition ranges from 50 to about 75 weight percent of the composition.

6. The process of claim 1 wherein the ferrierite zeolite is exchanged with a cation selected from the group consisting of hydrogen, ammonium, alkali metal and combinations thereof.

7. The process of claim 1 wherein the stabilizing metal is selected from the group consisting of aluminum, magnesium, and mixtures thereof.

8. The process of claim 1 wherein the stabilizing metal is incorporated into the pores of the ferrierite zeolite.

9. The process of claim 1 wherein the inorganic binder is selected from the group consisting of silica, alumina, silica alumina and mixtures thereof.

10. The process of claim 9 wherein the inorganic binder is alumina.

11. The process of claim 10 wherein the alumina is an acid or base peptized alumina.

12. The process of claim 10 wherein the alumina is aluminum chlorohydrol.

13. The process of claim 1 wherein the amount of inorganic binder present in the particulate $NO_x$ reduction composition ranges from about 10 to about 30 weight percent of the composition.

14. The process of claim 13 wherein the amount of inorganic binder present in the particulate $NO_x$ reduction composition ranges from about 15 to about 25 weight percent of the composition.

15. The process of claim 1 wherein the $NO_x$ reduction composition further comprises a matrix material selected from the group consisting of alumina, silica, silica alumina, titania, zirconia, yttria, lanthana, ceria, neodymia, samaria, europia, gadolinia, praseodymia, and mixtures thereof.

16. The process of claim 15 wherein the matrix material is present in an amount less than 70 weight percent.

17. The process of claim 1 further comprising recovering the cracking catalyst from said contacting step and treating the used catalyst in a regeneration zone to regenerate said catalyst.

18. The process of claim 17 wherein the cracking catalyst and the particulate $NO_x$ reduction composition are fluidized during contacting said hydrocarbon feedstock.

19. The process of claim 1 further comprising contacting the hydrocarbon feed with at least one additional $NO_x$ reduction composition.

20. The process of claim 19 wherein the additional $NO_x$ reduction composition is a non-zeolitic composition.

21. The process of claim 20 wherein the additional $NO_x$ reduction composition comprises (1) an acidic metal oxide containing substantially no zeolite; (2) a metal component, measured as the oxide, selected from the group consisting of an alkali metal, an alkaline earth metal and mixtures thereof; (3) an oxygen storage metal oxide component; and (4) at least one noble metal component.

22. The process of claim 19 wherein the additional $NO_x$ reduction composition is a low $NO_x$, CO combustion promoter composition which comprises (1) an acidic oxide support; (2) an alkali metal and/or alkaline earth metal or mixtures thereof; (3) a transition metal oxide having oxygen storage capability; and (4) palladium.

23. The process of claim 19 wherein the additional $NO_x$ reduction composition comprises (1) an acidic oxide support; (2) an alkali metal and/or alkaline earth metal or mixtures thereof; (3) a transition metal oxide having oxygen storage capability; and (4) a transition metal selected from Groups IB and IIB of the Periodic Table, and mixtures thereof.

24. The process of claim 19 wherein the additional $NO_x$ reduction composition comprises at least one metal-containing spinel which includes a first metal and a second metal having a valence higher than the valence of said first metal, at least one component of a third metal other than said first and second metals and at least one component of a fourth metal other than said first, second and third metals, wherein said third metal is selected from the group consisting of Group IB metals, Group IIB metals, Group VIA metals, the rare-earth metals, the Platinum Group metals and mixtures thereof, and said fourth metal is selected from the group consisting of iron, nickel, titanium, chromium, manganese, cobalt, germanium, tin, bismuth, molybdenum, antimony, vanadium and mixtures thereof.

25. The process of claim 24 wherein the metal containing spinel comprises magnesium as said first metal and aluminum as said second metal.

26. The process of claim 25 wherein the third metal component in the metal containing spinel is selected from the group consisting of a Platinum Group metal, the rare-earth metals and mixtures thereof.

27. The process of claim 24 wherein the third metal component is present in an amount in the range of about 0.001 to about 20 weight percent, calculated as elemental third metal.

28. The process of claim 24 wherein said fourth metal component is present in an amount in the range of about 0.001 to about 10 weight percent, calculated as elemental fourth metal.

29. The process of claim 19 wherein the additional $NO_x$ reduction additive is a zinc based catalyst.

30. The process of claim 19 wherein the additional $NO_x$ reduction additive is an antimony based $NO_x$ reduction additive.

31. The process of claim 19 wherein the additional $NO_x$ reduction additive is a perovskite-spinel $NO_x$ reduction additive.

32. The process of claim 19 wherein the additional $NO_x$ reduction additive is a hydrotalcite containing composition.

33. The process of claim 1 wherein the particulate $NO_x$ reduction composition has a mean particle size from about 50 to about 200 μm.

34. The process of claim 33 wherein the particulate $NO_x$ reduction composition has a mean particle size from about 55 to about 150 μm.

35. The process of claim 1 wherein the particulate $NO_x$ reduction composition has a Davison attrition index (DI) value of less than 50.

36. The process of claim 35 wherein the particulate $NO_x$ reduction composition has a DI value of less than 20.

37. The process of claim 35 wherein the particulate $NO_x$ reduction composition has a DI value of less than 15.

38. The process of claim 1 wherein the amount of the $NO_x$ reduction composition is that amount sufficient to provide a ratio of ferrierite zeolite to Y-type zeolite in the total catalyst inventory of less than 2.

39. The process of claim 19 wherein the additional $NO_x$ reduction composition comprises (i) an acidic metal oxide, (ii) cerium oxide, (iii) a lanthanide oxide other than ceria, and (iv) optionally, at least one oxide of a transition metal selected from Groups IB and IIB of the Periodic Table, noble metals and mixtures thereof.

40. The process of claim 1 wherein the matrix material is at least one selected from the group consisting of alumina, silica alumina, rare earth oxides, transitional metals oxides, Group IIA oxides, clays, and mixtures thereof.

\* \* \* \* \*